Oct. 4, 1932.  L. J. CAMPBELL  1,880,784
SYNCHRONIZING CLUTCH FOR TRANSMISSION MECHANISMS
Filed May 8, 1931
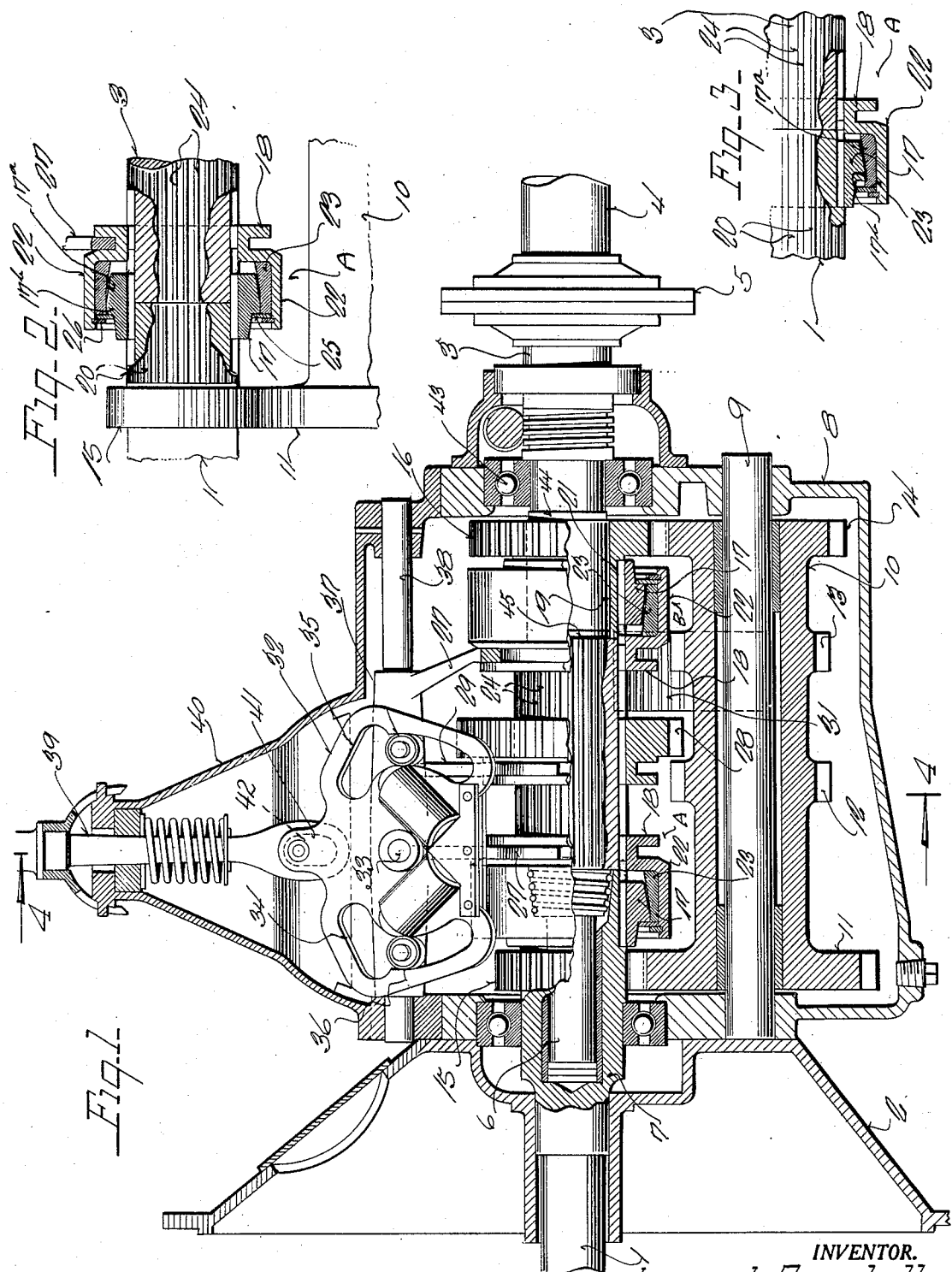
INVENTOR.
Leon J. Campbell
BY
ATTORNEYS Patented Oct. 4, 1932

1,880,784

UNITED STATES PATENT OFFICE

LEON J. CAMPBELL, OF CHICAGO, ILLINOIS, ASSIGNOR TO HAND'S CONSTANT MESH TRANSMISSION CO., OF CHICAGO, ILLINOIS, A CORPORATION OF ILLINOIS

SYNCHRONIZING CLUTCH FOR TRANSMISSION MECHANISMS

Application filed May 8, 1931. Serial No. 535,821.

This invention relates to synchronizing clutches for transmission mechanisms, for motor vehicles, whereby the speed changes may be easily and quickly made without shock or gear clashing.

In my co-pending applications, Serial No. 477,362, filed August 23, 1930, now Patent No. 1,800,928, granted April 14, 1931 and Serial No. 514,668, filed February 9, 1931, I have shown and described synchronizing clutches of the combined friction and positive type, the friction clutch operating in advance of the positive clutch to synchronize the speeds of the elements being connected prior to their positive connection through the positive clutch. In said applications, the friction clutch element or ring is carried by one of the clutch members, while the positive clutch element or ring is carried by the other of the clutch members. This is not objectionable, but it increases the cost of the manufacture of the device and also the number of parts required for the assembly. Also in the applications, the members of the friction clutches are fixed to their associated gears, thereby preventing interchangeability of such members, in that the parts after being lapped or ground, are not likely to fit unless kept together, which requires accurate and careful handling and sorting while the transmission is going through production.

The object of my present invention is to so construct and arrange the parts of the clutch devices that the positive clutch element serves also as a part of the friction clutch, thereby reducing the cost of manufacture and number of parts for each unit. Moreover, this clutch element is not connected to any of the gears and thus may be interchangeably used, which feature has the advantage in assembling the transmission while in production and also when in for repair of replacement of any of the clutch parts.

Another object of my invention is to so arrange the friction band of the friction clutch that said band co-acts with the outer peripheral surface of the positive clutch element in the operation of the friction clutch.

A further object of my invention is to provide the peripheral surface of this positive clutch element with joined inclined and concentric portions, the latter serving as a support for the band in the shifting of the friction clutch element with respect to the positive one, the band being moved into and out of driving contact with the inclined portion in the closing and opening of the friction clutch.

A further object of my invention is to so design the transmission that the second or intermediate speed gear is arranged on the transmission shaft adjacent the bearing for that shaft opposite the spigot bearing between said shaft and the shaft of the master clutch, so that the first mentioned bearing and not the latter will take the load when the transmission is placed in second or intermediate speed.

The invention consists further in the matters hereinafter described and claimed.

In the accompanying drawing:—

Fig. 1 is a vertical longitudinal sectional view of a transmission mechanism embodying my invention, parts thereof being shown in elevation;

Fig. 2 is a similar view, showing the parts of one of the clutches in the positions they occupy when the positive clutch is in use, that is, with the positive clutch element in bridging relation with respect to the shafts which it connects; and Fig. 3 shows the parts of the clutch in the positions they occupy when the friction clutch is in use;

In the drawing, 1 indicates the driving shaft of the transmission, such shaft extending through the bell housing 2 of the main master clutch of the vehicle and being connectable through such clutch with the power or crank shaft of the engine as in devices of this character. 3 indicates the driven shaft of the transmission, which shaft is connected with the propeller shaft 4 of the vehicle through the usual flexible coupling 5, as shown in Fig. 1. Shaft 3 is normally disconnected from shaft 1 and is maintained in alinement therewith by a pilot 6 on shaft 3 extending into a bushing lined bore or recess 7 in shaft 1, as shown in Fig. 1.

Shafts 1 and 3 are suitably journaled in a gear box or housing 8, in which is also located a counter or lay shaft 9 on which is journaled a sleeve 10 provided with gears 11, 12, 13 and 14. These gears are connected with the sleeve to rotate therewith, and constitute in the order named the constant gear first or low speed gear, the reverse gear and the second or intermediate gear. This arrangement is employed in a transmission of the type having three speeds forward and one speed in reverse. Fixed to shaft 1, at one end of the case, namely the forward end thereof, is a gear 15 which is in constant mesh with gear 11, and consequently rotates sleeve 10 and its gears at a reduced speed when power is applied to the shaft 1. Revolvubly mounted on shaft 3, at the other or rear end of the case, is a gear 16 which is in constant mesh with gear 14 on sleeve 10.

The clutch devices of my invention are associated with shafts 1 and 3 whereby said shafts may be either directly connected, as for high speed or direct drive or be indirectly connected through sleeve 10 for second or intermediate speed. The clutch device for the direct drive is indicated by A while the clutch device for intermediate or second speed is indicated by B. Each clutch device comprises a pair of clutch members or elements 17, 18. The member 17 is the innermost member of the device, that for clutch A being splined on shaft 1 at its end adjacent shaft 3. The corresponding member for clutch B is splined on the hub 19 of gear 16, as shown in Fig. 1. The splines on shaft 1 are indicated by 20 (Fig. 2), while the splines on the hub of gear 16 are indicated by 21. The outer member 18 of each clutch device A and B is provided with a laterally projecting cylindrical flange 22 extending over the associated clutch member 17, and forming a housing and support for a band 23 of suitable friction material. Each band 23 surrounds its associated member 17, the periphery of the latter having joined tapered or inclined and concentric portions 17$^a$ and 17$^b$, respectively. The tapered portion 17$^a$ extends to the inner edge of the member 17, that is, the edge opposite the associated member 18, and thus provides a wedge-shape chamber between member 17 and flange 22 on the member 18. The concentric portion 17$^b$ is at the outer edge of the member 17 and provides a supporting surface for the band 23. The latter is preferably made to conform to the shape of the chamber or space between member 17 and the surrounding flange 22, and in all shifted positions of the members, the band contacts with and is supported by the concentric portion 17$^b$ of member 17. When the parts are in neutral, as shown in Fig. 1, that is, establishing no clutched connection between them, the inner surface of the band 23 is out of contact with the tapered or inclined surface 17$^a$ of member 17. When member 18 is moved toward member 17, the portion of the band 23 on the concentric portion 17$^b$ of the latter member slides thereon and permits the following portion of the band to be compressed against the inclined portion 17$^a$ of member 17, thereby frictionally connecting members 17 and 18 through the band. Member 17 is held from movement away from member 18 by the splines on member 17 being in contact with the closed ends of the grooves as made by the splines on the shaft 1 or on hub 19, as the case may be.

The outer member 18 of each clutch device is slidably supported on the portion of the shaft 3 between shaft 1 and the hub of gear 16. This portion of shaft 3 is splined as indicated by 24, and each outer clutch member 18 engages these splines so as to have sliding movement on shaft 3. Members 17 and 18 of each clutch device are connected together for movement in unison by the provision of a collar 25 mounted on clutch member 17, and extending over the outer edge of the friction band 23. Collar 25 is held in place by a split locking ring 26 engaged in a groove on the inner side of the flange 22 on the outer side of the collar, as shown in Figs. 1 and 2. By this arrangement, when the outer clutch member 18 is moved or shifted axially in a direction away from its cooperating member 17, the latter will be coupled with member 18 for movement therewith. Members 18 are moved in opposite directions through forks 27, one for each member and engaging the same in an annular groove therein, as shown.

When in neutral, members 17 of clutch devices A and B are supported entirely by shaft 1 and the hub of gear 16, respectively, whereas members 18 are supported entirely on shaft 3, being out of engagement with the splines on shaft 1 and the hub of said gear, as shown in Fig. 1. At this time friction bands 23 are not in driving engagement with members 17 and the two members of each clutch device are free to rotate relatively to each other. The ends of the splines in members 18 terminate sufficiently short of the inner edges of said members to permit the same to be slid partially onto shaft 1 or hub of gear 16 when compressing bands 23 without interference by the splines on said parts. This connects the parts through the friction clutches to synchronize them in advance of their connection by the positive clutch members 17. When members 18 are moved in the opposite direction, the first action is to release the pressure on the friction bands 23 and move them out of driving engagement with members 17, thereby opening the friction clutches. Thereafter continued movement of member 18 draws its cooperating member 17 over the joint between shafts 1 and 3 or between shaft 3 and hub of gear 16, as the case may be, and into engagement with the splines on shaft 3. The extent of movement given to member 17 is merely sufficient to cause it to bridge the joint and connect the splines of both parts to provide a positive driving connection between them.

In the form of transmission shown in Fig. 1, the clutch devices A and B operate in sequence. In short, one clutch device remains neutral while the other clutch device is being operated, thereby permitting the use of one clutch device to effect one speed change, and the use of the other clutch device to effect another speed change. When clutch device A is operated friction band 23 is first compressed to connect shafts 1 and 3 through the friction clutch and thereafter a positive connection is secured between these shafts by moving inner clutch member 17 into bridging relation with respect to said shafts, as shown in Fig. 2. Clutch device B at this time is in neutral and is not operated until after clutch A is returned to neutral. When clutch device B is operated, the friction clutch is first engaged to synchronize gear 16 with shaft 3, whereupon a continued operation of the clutch unit directly connects gear 16 with shaft 3 by member 17 being shifted into bridging relation with respect to the hub of the gear and said shaft. The operation of the clutch devices A, B is controlled through the usual manual shift lever provided in the car for the transmission as in motor vehicle design.

It will be observed that each clutch device comprises virtually two members 17 and 18, with member 17 serving a dual purpose, constituting the positive clutch element of the unit and also a part of the friction clutch. This simplifies the construction and reduces the cost of manufacture. Moreover, the elements of the several clutch units being exactly the same in construction and having the same relationship when assembled they can be interchangeably used, thereby permitting the clutch units to be assembled in the production of the transmission, without the necessity of keeping the parts separate and in groups as when a more complicated arrangement is employed. With the parts reduced to a minimum number as in accordance with my present invention, the clutch elements may be removed and replaced as readily and as easily as the removal and replacement of a slide gear in the transmission. It is also to be noted that the inner clutch member 17 of each unit is not fixed to a gear, thereby allowing for its ease of removal and interchangeable use in any unit.

The splines 24 on the portion of the shaft 3 between the clutch units A and B also serve to slidably support a slide gear 28, which is adapted to mesh with gear 12 on sleeve 10 when connecting the transmission through first or low speed. Gear 28 is shifted through a fork 29 fixed to a shift rod (not shown) in the upper part of case 8. Mounted in case 8 is an idler gear 31 constantly in mesh with gear 13 on sleeve 10, and having a width sufficient to be engaged by gear 28 when shifted out of mesh with gear 12 to secure reverse through the transmission.

The elements of clutch units A and B are respectively shifted through the medium of a cam plate 32 fulcrumed at 33 in the gear box 8 in the same manner as in my co-pending application and patent as aforesaid. Cam plate 32 is provided with cam slots 34, 35, having joined eccentric and concentric portions in which operate rollers 36, 37, carried by shift rod 38, the same as in said co-pending application and patent. The shift lever 39 of the transmission is mounted in the extension 40 on the top of box 8, and has an aperture or recess 41 to engage over a spherical member 42 carried by the cam plate above its fulcrum 33 the same as in my co-pending application and patent. Reference to the patent can be had for a full description of the cam plate and its method of operation, it only being necessary to recite here that by reason of the cam plate, the clutch units A and B are operated in sequence, one cam slot serving one unit, while the other the other. This permits the units to be operated through the movement of the shift lever 39 in opposite directions. In the appended claims, reference to alined shafts contemplates shafts 1 and 3 as for clutch unit or device A, as well as shaft 3 and hub 19 of gear 16 for clutch unit B.

As shown in Fig. 1, an anti-friction bearing 43 supports shaft 3 where it extends through the rear wall of the gear case or box 8. Gear 16 is located on shaft 3 immediately inside of this bearing, and runs against a collar 44 on shaft 3 between the bearing and the gear, as shown. The portion of shaft 3 encircled by hub 19 is reduced in diameter to provide a seat for the hub and bring its splines 21 substantially flush with those on shaft 3. Reducing shaft 3 provides a shoulder 45 for the outer end of hub 19. With gear 16 running between shoulder 45 and collar 44, the gear is held from endwise movement on shaft 3. Consequently gear 16 cannot be displaced in the shifting of the members of clutch unit B. Moreover, the wide bearing provided by hub 19 holds gear 16 steady on shaft 3 and causes it to run in proper pitch relation with gear 14 on sleeve 10. Furthermore, by reason of the wide bearing, gear 16 is not tilted on the application of the load thereto through the clutch B.

It is to be noted that the spigot bearings 6—7 for shafts 1 and 3 are at the forward end of the case 8, thereby being considerably removed from gear 16 and bearing 43. With the spigot bearing so located, it is in a sense an overhanging bearing with respect to bearing 43, and is likely to have an eccentric motion when pressure is applied through the master or main clutch in bell housing 2. Moreover, the latter is not always in true alinement with clutch shaft 1, and thus tends to further mis-aline shafts 1 and 3 at their meeting ends. In removing the gear 16 to the rear, it has the support of the bearing 43, and thus will not be thrown out of alinement regardless of the mis-alining conditions or influences at the opposite end of the shaft.

The details of structure and arrangement of parts may be variously changed and modified without departing from the spirit and scope of my invention.

I claim as my invention:

1. The combination with alined normally disconnected splined driving and driven shafts, of a combined friction and positive clutch for said shafts, the positive clutch consisting of a member movable into bridging relation with the adjacent ends of said shafts and engaging the splines thereof when connecting the shafts together, and also serving as a part of the friction clutch.

2. The combination with alined normally disconnected splined driving and driven shafts, of a combined friction and positive clutch for said shafts, the positive clutch consisting of a member movable into bridging relation with the adjacent ends of said shafts and engaging the splines thereof when connecting the shafts together, the outer peripheral surface of said member serving as a part of the friction clutch.

3. The combination with alined normally disconnected splined driving and driven shafts, of a combined friction and positive clutch for said shafts, the positive clutch consisting of a member normally engaged with the splines of one shaft and movable into engagement with the splines of the other shaft for connecting the shafts through the positive clutch, the friction clutch including a member splined on said other shaft, and a friction band interposed between and cooperating with both of said clutch members to connect the shafts through the friction clutch.

4. The combination with alined normally disconnected splined driving and driven shafts, of a combined friction and positive clutch for said shafts, the positive clutch consisting of a member normally connected with the splines of one shaft and movable into engagement with the splines of the other shaft for connecting the shafts through the positive clutch; the friction clutch including a member splined on said other shaft and having a flange extending over the positive clutch member, a friction band carried by said flange and cooperable with the positive clutch member for connecting the shafts through the friction clutch, and means for shifting the clutch members to effect connection of the shafts through the friction and positive clutches, respectively.

5. The combination with alined normally disconnected splined driving and driven shafts, of a combined friction and positive clutch for said shafts, the positive clutch consisting of a member normally engaged with the splines of one shaft and movable into engagement with the splines of the other shaft for connecting the shafts through the positive clutch, the friction clutch including a member splined on said other shaft and having a flange extending over the positive clutch member, a friction band supported by said flange and engageable with the positive clutch member for connecting the shafts through the friction clutch, and means connecting the clutch members through said band whereby the clutch members may be shifted to effect connection of the shafts through the friction and positive clutches, respectively.

6. The combination with alined normally disconnected splined driving and driven shafts, of a combined friction and positive clutch for said shafts, the positive clutch consisting of a member normally engaged with the splines of one shaft and movable into engagement with the splines of the other shaft for connecting the shafts through the positive clutch, the friction clutch including a member engaged with the splines of said other shaft and having a flange surrounding the positive clutch member, the latter having an inclined peripheral surface to provide a wedge-shaped chamber opposite said flange, and a friction band in said chamber and engageable with both clutch members to effect connection of the shafts through the friction clutch.

7. The combination with normally disconnected splined driving and driven shafts, of a combined friction and positive clutch for said shafts, the positive clutch consisting of a member normally engaged with the splines of one shaft and movable into engagement with the splines of the other shaft for connecting the shafts through the positive clutch, the friction clutch including a member splined on said other shaft and having a flange extending over the positive clutch member, and a friction band interposed between said members, said band being compressed between said members in the movement of one toward the other when connecting the shafts through the friction clutch, the positive clutch member being held against movement at such time by engagement with the closed ends of the cooperating splines.

8. The combination with alined normally disconnected splined driving and driven shafts, of a combined friction and positive clutch for said shafts, the positive clutch consisting of a member normally engaged with the splines of one shaft and movable into engagement with the splines of the other shaft for connecting the shafts through the positive clutch, the friction clutch including a member splined on said other shaft and having a flange extending over the positive clutch member, and a friction band interposed between said flange and said positive clutch member, said flange and positive clutch member being formed to provide a wedge-shape chamber between them in which the band is compressed when connecting the shafts through the friction clutch.

9. The combination with alined normally disconnected splined driving and driven shafts, of a combined friction and positive clutch for said shafts, the positive clutch consisting of a member normally engaged with the splines of one shaft and movable into engagement with the splines of the other shaft for connecting the shafts through the positive clutch, the friction clutch including a member splined on said other shaft and having a flange extending over the positive clutch member, and a friction band interposed between said flange and said positive clutch member, the latter having its outer peripheral surface formed with joined inclined and concentric portions, the latter serving as a support for the inner surface of the band whether in or out of driving engagement with said inclined surface.

In testimony whereof I affix my signature.

LEON J. CAMPBELL.